2,762,699

PROCESS FOR THE PRODUCTION OF AMMONIUM SULPHATE-NITRATE

Walter Steinle, Wanne-Eickel, and Fritz Exner, Herne, Germany, assignors to Bergwerksgesellschaft Hibernia Aktiengesellschaft, Wanne-Eickel, Germany, a German company No Drawing. Application February 8, 1952, Serial No. 270,758

Claims priority, application Germany March 27, 1951

1 Claim. (Cl. 71—54)

This invention relates to a process for the production of ammonium sulphate-nitrate.

It is known to produce ammonium sulphate-nitrate by simultaneously feeding sulphuric acid, nitric acid and gaseous ammonia into a saturator. In this known process the sulphuric acid must have a concentration of at least 77–78% $H_2SO_4$ and the nitric acid one of 50% $HNO_3$ in order to evaporate the water contained in these acids by means of the heat produced. The ratio of the amounts of the acids which are necessary is determined by the fact that a salt must be made with a content of 26% nitrogen, consisting of 60% $(NH_4)_2SO_4$ and at most 40% $NH_4NO_3$. The known process has caused considerable technical difficulties since the required ratio between ammonia-nitrogen and nitrate-nitrogen can only be achieved by the most accurate maintenance of the above acid concentrations. For the same reason the manufacture of a uniform fertilizer capable of storage and spreading could not be guaranteed by the known process.

It is an object of this invention to provide a simple, economic and effective process for the manufacture of ammonium sulphate-nitrate. Other objects will become apparent hereinafter.

It has now been found that the above difficulties and disadvantages can be completely overcome if the reaction of the nitric acid with ammonia is carried out not in the saturator but separately in a preliminary stage preferably under a vacuum. If the neutralisation is effected under ordinary or excess pressure the ammonium nitrate solution so produced may subsequently be brought under vacuum. If necessary it is even possible, in the case of specially highly diluted nitric acid, to undertake a still further concentration by an additional supply of heat. In other words the ammonium nitrate solution obtained is pre-concentrated by evaporation of part of the water before being introduced into the saturator together with ammonia and sulphuric acid. A considerably greater amount of the water contained in the acid is thereby evaporated than is the case in the saturator operating in a normal manner under atmospheric pressure.

To keep the saturator under vacuum in order to attain the same evaporation effect is not desirable because of the technical difficulties involved. On account of the poor capacity for absorption of the viscous melt of salts containing ammonium sulphate partly in solid form large amounts of ammonia gas escape when the liquid is drawn off, the recovery of which is possible only with losses and at considerable technical expense. By contrast, in the process of the invention the hot ammonia-containing vapours coming from the saturator can be worked up without loss directly in the preliminary stage of nitrate neutralisation. This produces a thin liquid salt solution of high absorptive capacity, whereby on account of the high temperature of the liquid the evaporation of water is further increased.

A further advantage of the process of the invention consists in that by the addition of the pre-formed ammonium nitrate solution simultaneously with sulphuric acid and ammonia into the saturator, the concentration of the acid used can vary considerably without disadvantageously affecting the manufacturing process and the quality of the salt.

It has been found, surprisingly, that a further substantial improvement of this invention consists in that the throughput of the saturator can be doubled.

The invention will be more clearly understood by reference to the following example which is purely illustrative.

EXAMPLE

In this example conditions under the known process are contrasted with those under the new process.

(a) Known process 59.0 tons of $HNO_3$ (50%), 59.5 tons of $H_2SO_4$ (78%) and 24.6 tons of $NH_3$ gas were introduced into the saturator and yielded 100 tons of ammonium sulphate-nitrate. 41,000,000 heat units were liberated in the process and with a 90% efficiency 37,000,000 useful heat units remain. For the heating up and evaporation of 45,000 kg. of water, 30,000,000 heat units were used and with the residual 7,000,000 heat units the molten salts can be heated to 150° C. which fully suffices to obtain an unobjectionable melt.

(b) New process

In the preliminary stage 59.0 tons of $HNO_3$ (50%) and 8.5 tons of $NH_3$ gas gave 53.0 tons of ammonium nitrate lye (71.5%). 15,000 kg. of water were thereby evaporated. 59.5 tons of $H_2SO_4$ (78%), 16.1 tons of $NH_3$, and 53.0 tons of ammonium nitrate lye (71.5%) were simultaneously fed into the customary saturator which gave 100 tons of ammonium sulphate-nitrate. In this process 31,000,000 heat units were liberated and with 90% efficiency 28,000,000 heat units remain usable. For the heating up and evaporation of 28,000 kg. of water 18,000,000 heat units are needed and with the residual 10,000,000 units the melt of salts can be heated up to 215° C.

From this example it is apparent:

(a) The amount of water to be evaporated in the saturator is reduced from 45,000 kg. to 28,000 kg., and (b) By raising the temperature to which the melt is heated from 150° to 215° C. less concentrated acids can be used.

While the invention has been described in detail in the above example and description it will be understood that modifications and variations therein may be effected without departing from the spirit and scope of the invention as it is defined by the appended claim.

We claim:

A process for the continuous manufacture of ammonium sulphate-nitrate, a double salt having the formula $(NH_4)_2SO_4 \cdot 2NH_4NO_3$, comprising the steps of (1) neutralizing a known quantity of dilute nitric acid with ammonia-containing vapors in sub-atmospheric pressure, (2) removing the steam formed by the heat of reaction from the resulting concentrated ammonium nitrate solution, (3) reacting said concentrated ammonium nitrate solution with a quantity of sulphuric acid equal to the quantity of said dilute nitric acid and an excess of ammonia gas necessary to completely neutralize said sulphuric acid, (4) removing the $(NH_4)_2SO_4 \cdot 2NH_4NO_3$ reaction product and (5) recycling back to step (1) the ammonia-containing vapors evolved by the heat of reaction of step (3).

References Cited in the file of this patent

UNITED STATES PATENTS

| | | |
|---|---|---|
| Re. 21,217 | Fauser | Sept. 26, 1939 |
| 1,306,924 | Partington et al. | June 17, 1919 |
| 1,315,674 | Landis | Sept. 9, 1919 |
| 1,884,105 | Moore | Oct. 25, 1932 |
| 1,931,768 | Moore | Oct. 24, 1933 |
| 2,025,915 | Tramm | Dec. 31, 1935 |
| 2,551,569 | Strelzoff | May 1, 1951 |

FOREIGN PATENTS

| | | |
|---|---|---|
| 356,759 | Great Britain | Sept. 3, 1931 |
| 357,396 | Great Britain | Sept. 24, 1931 |